United States Patent

Granryd

[15] 3,677,026
[45] July 18, 1972

[54] INTERNAL COMBUSTION HEAT ENGINE AND PROCESS

[72] Inventor: Eric G. U. Granryd, Viggbyholm, Sweden

[73] Assignee: American Gas Association, Arlington, Va.

[22] Filed: Nov. 20, 1970

[21] Appl. No.: 91,355

[52] U.S. Cl. ..............................62/115, 123/1 R, 123/51 R, 123/122 R, 60/24
[51] Int. Cl. ......................F25b 1/00, F03g 7/06, F02b 1/00
[58] Field of Search ............60/24; 123/51 BA, 51 B, 51 BB, 123/51 R, 122 R, 1; 62/115

[56] References Cited

UNITED STATES PATENTS

| 155,087 | 9/1874 | Hirsch | 60/24 |
| 389,045 | 9/1884 | Bair | 60/24 |
| 3,426,525 | 2/1969 | Rubin | 60/24 |
| 3,477,226 | 11/1969 | Percival | 60/24 |
| 3,488,945 | 1/1970 | Kelly | 60/24 |

Primary Examiner—Wendell E. Burns
Attorney—Alexander and Speckman

[57] ABSTRACT

A process for conversion of chemical energy to mechanical energy by heating air within a substantially gastight gas chamber by passage in heat-exchange relation with a moving heat-regenerative means within the chamber, substantially continuous burning of an injected combustible fluid fuel during injection thereof resulting in substantial increase in the average temperature-pressure relation of the gas within the gas chamber, expanding said gas chamber by movement of a pressure-responsive member, and heating the heat-regenerative means by passage of the combustion product gas in heat-exchange relation with the moving heat-regenerative means. An internal combustion heat engine having a movable heat-regenerative means within a sub-stantially gastight gas chamber defined by a casing, the movable heat-regenerative means by its movement causing passage of enclosed gases in heat-exchange relation with the heat-regenerative means, and having an air intake conduit, exhaust conduit, fuel injection means, an ignition means and a pressure-responsive member. A gas cooling system wherein a compression means is actuated by movement of the pressure-responsive member of the internal combustion heat engine.

17 Claims, 11 Drawing Figures

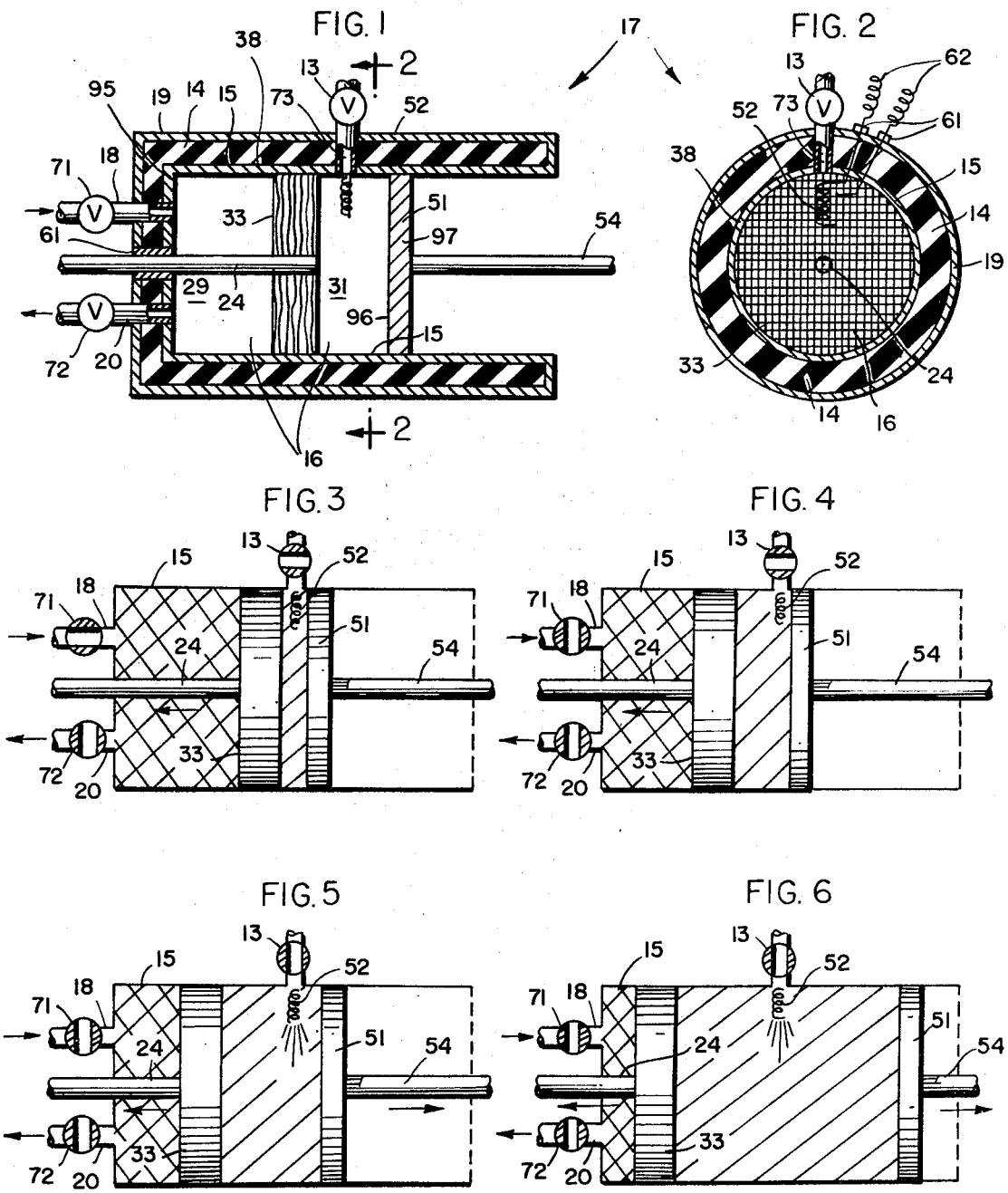
PATENTED JUL 18 1972  3,677,026  SHEET 1 OF 3
INVENTOR:
ERIC G. U. GRANRYD
BY
Alexander & Speckman
ATT'YS

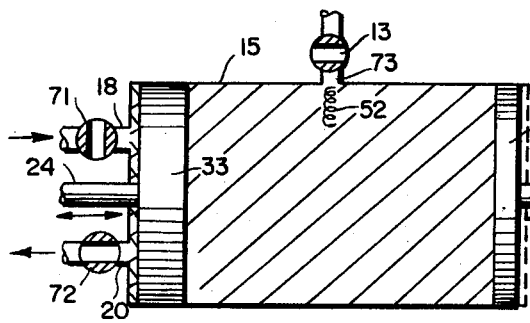
FIG. 7
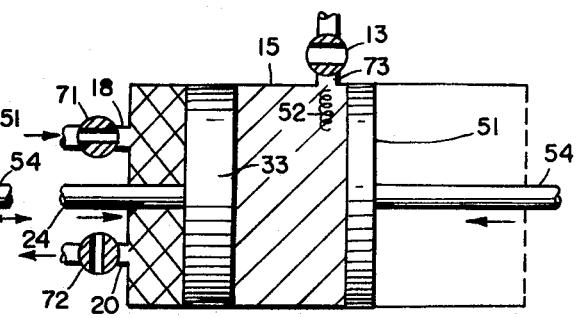
FIG. 8
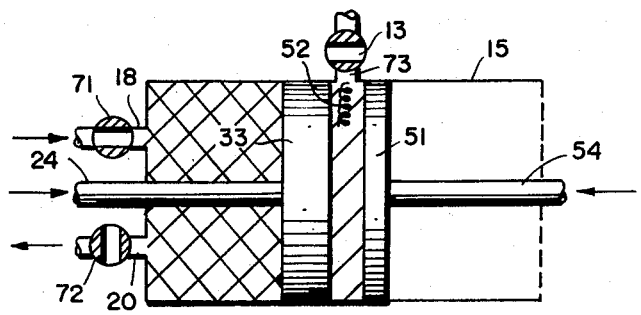
FIG. 9
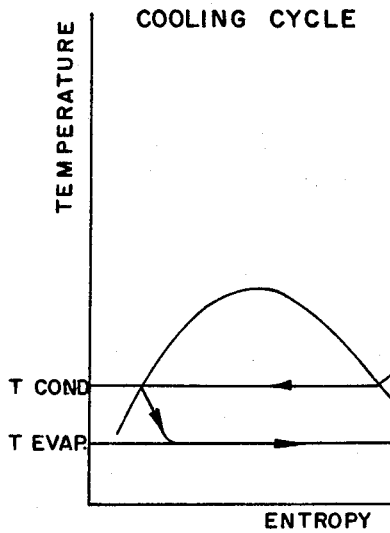
FIG. 10
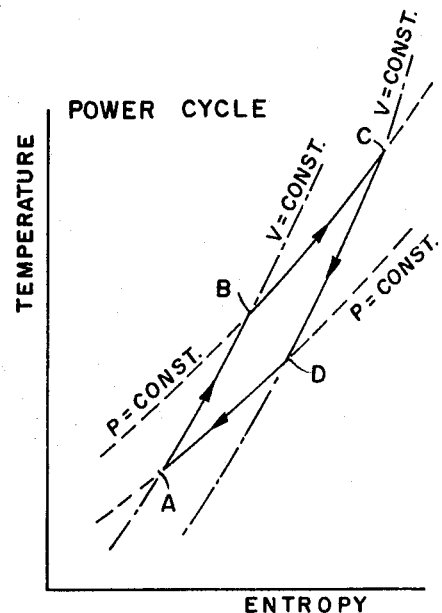

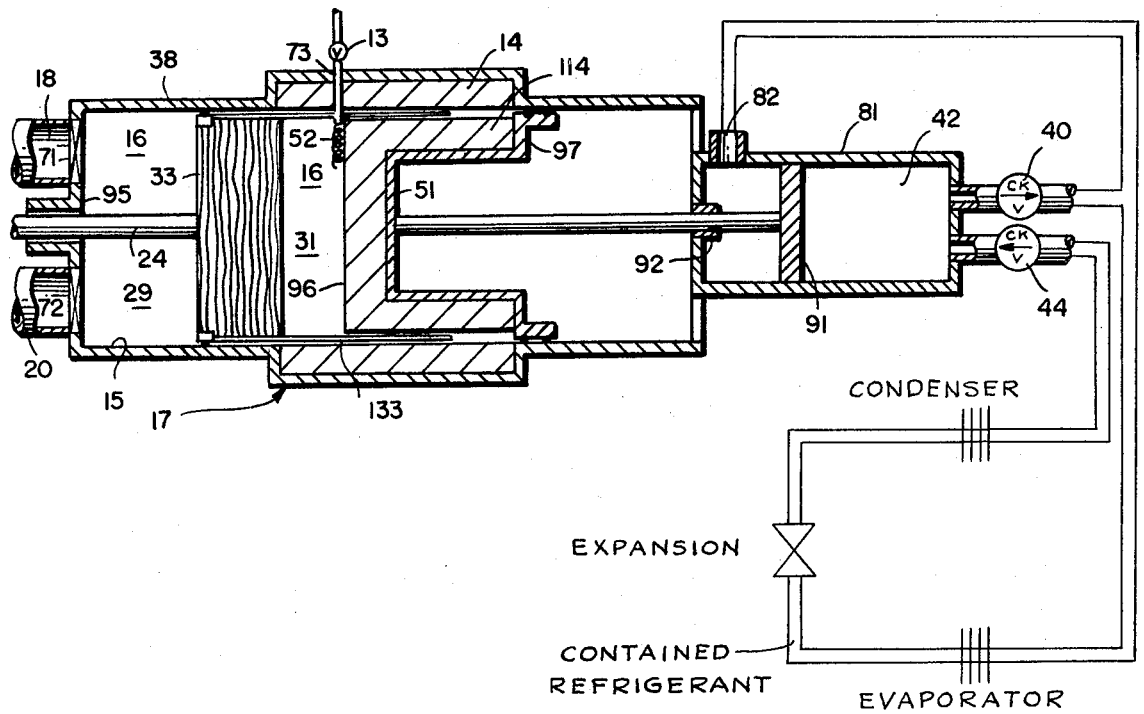

INTERNAL COMBUSTION HEAT ENGINE AND PROCESS

Heretofore heat engines have used external burners to heat gases. Two such heat engines are described in U.S. Pat. Nos. 2,894,368 and 1,675,829. Other heat engines have made use of other types of external heat sources. In particular attention is drawn to my U.S. Pat. No. 3,474,641 wherein heat is provided by heating means such as a tube bundle heater containing hot fluid or a burning fuel such as natural gas.

I have discovered a new and efficient process, a process of internal combustion, for providing heat for a heat engine. Oxidation of a combustible fluid fuel injected into a closed volume will cause an increase in the average temperature-pressure relation of the gas within said closed volume. The heat energy produced during a period of continuous combustion may be stored in a heat-regenerative means within said closed volume and may be used to heat fresh air thereby raising the temperature-pressure relation such that another period of continuous combustion may readily occur. The heat-regenerative means, after said period of combustion, will aid in lowering the temperature, and hence the temperature-pressure relation, of the enclosed gas. The difference in pressures may be harnessed by use of a wide variety of pressure-responsive members to produce readily usable mechanical energy.

A gas chamber defined by a casing and containing a movable heat-regenerative means the movement of which causes passage of an enclosed gas in heat-exchange relation with the heat-regenerative means can be used as a chamber for the burning of a combustible fluid fuel. The heat-regenerative means may be alternately used to cool the gases heated by combustion and to heat fresh air for later support of combustion by the displacement of relatively hot and relatively cool gas therethrough. Various pressure-responsive members may be made a part of the casing of this device to harness the pressure changes for mechanical work.

In particular, a generally cylindrical gas chamber and a generally cylindrical movable heat-regenerative means contained within the gas chamber and movable therein in a fashion substantially parallel to the axis of the gas chamber may be used. The heat-regenerative means causes passage of the enclosed gas by a reciprocating movement.

The internal combustion heat engine of my invention may be used efficiently to actuate a compressor used in a cooling apparatus. The refrigerant of the cooling apparatus will remain in a closed system, and will not enter the gas chamber of the internal combustion heat engine of this invention.

Heretofore, some internal combustion engines have injected a fuel into a combustion chamber before conditions would allow combustion. For example, the common 4-stroke cycle used in automobile engines injects a mixture of fuel and air, thereafter compresses it and ignites an explosion with a spark. The injection of gas is complete before ignition occurs. The internal combustion engine of my invention, on the other hand, provides substantially continuous burning of fuel during the period said fuel is being injected. The combustion is continuous, not an explosion, and occurs as the fuel is being injected. Further, internal combustion engines of the prior art have required a high degree of torque because of the mechanical compression of the fuel and air before combustion. Both diesel engines and the common 4-stroke cycle engines depend on mechanical compression to create conditions suitable for combustion. The high degree of torque required has resulted in starting problems. The internal combustion engine of my invention requires significantly less torque because it is not necessary to provide mechanical compression. A "preheating" of the air before combustion is obtained by regeneration of heat stored in a heat-regenerative means, rather than by a compression using mechanical energy stored in a fly wheel as is common in the prior art.

Many internal combustion engines of the prior art use spark plugs to ignite the mixture of fuel and air. The use of spark plugs created a problem of timing, it being necessary that the plug sparked at the proper time in the cycle. Faulty timing resulted in improper firing or failure thereof. In the internal combustion engine of my invention a continuous period of combustion is used. No timed spark plug is required. An ignition means, such as a glow plug or hot coil, serves to ignite the fuel. Therefore, there are no associated problems of timing a spark. Furthermore, the ignition means may be necessary only during the start-up period, since enough heat is regenerated to ignite the fuel spontaneously.

Internal combustion engines of the prior art are exposed to "explosions" and the consequent rapid extreme pressure variation. The internal combustion engine of my invention undergoes a period of continuous combustion, and need not withstand an explosion. In addition, no valve of my internal combustion engine is exposed to hot gases as is common in the prior art. The valves of my internal combustion engine may provide access to the "cold" volume of the gas chamber. Another significant advantage of the internal combustion engine of my invention is the relatively low noise level which results from its operation in comparison with the noise level of the internal combustion engine of the prior art. The reduced noise level is because the combustion of my internal combustion engine is continuous and not explosive and because heat-regeneration does not require mechanical compression.

Mechanical energy is derived from the process and from the engine of my invention by harnessing the expansion of enclosed gas due to heat occurring within the gas chamber by a wide variety of pressure-responsive members.

It is an object of my invention to provide a heat engine having a completely internal heat source.

It is a further object of my invention to provide a heat engine which utilizes internal combustion as a heat source.

Yet another object of my invention is to provide an efficient internal combustion heat engine wherein heat of combustion is preserved in a heat-regenerative means for use in creating pressure-temperature conditions necessary for combustion in subsequent cycles.

Another object of my invention is to provide an internal combustion heat engine having a movable heat-regenerative means.

A further object of my invention is to provide an efficient internal combustion heat engine wherein heat of combustion is preserved in a movable heat-regenerative means for use in creating pressure-temperature conditions necessary for combustion in subsequent cycles.

It is still another object of my invention to provide such an internal combustion heat engine for use as a prime mover.

A further object of my invention is to provide an internal combustion engine wherein the combustion occurs as the fuel is injected into the combustion chamber.

Another object of my invention is to provide an internal combustion engine wherein combustion occurs substantially continuously during fuel injection.

A further object of my invention is to provide an internal combustion engine having no timing problems associated with spark plugs of internal combustion engines of the prior art.

Still another object of my invention is to provide an internal combustion engine having no valves exposed to the hottest gases of combustion.

Another object of my invention is to provide an internal combustion engine having less noise then internal combustion engines of the prior art.

A still further object of my invention is to provide a cooling apparatus comprising an internal combustion heat engine which compresses a refrigerant in a system separate from the internal combustion engine.

These and other important objects will become apparent from the following description and from the drawings showing preferred embodiments wherein:

FIG. 1 is a plan view in cross section of the internal combustion engine of my invention;

FIG. 2 is a side sectional view of the internal combustion engine of FIG. 1 as shown in FIG. 1;

FIGS. 3 through 9 inclusive schematically illustrate the operating principles of the novel internal combustion heat engine of this invention;

FIG. 10 is a graph illustrating the thermal energy properties of the fluids in the cooling apparatus of this invention;

FIG. 11 is a plan view in cross section of the internal combustion heat engine of my invention as used for a compressor such as in a refrigeration system.

Referring specifically to FIGS. 1 and 2, the components of an embodiment of the internal combustion engine of this invention are shown as engine 17, shell casing 19, including side wall 38, first end 95 and second end 96 and with insulation 14 defining gas chamber 16 which is generally cylindrical in shape. Communicating from chamber 16 to external reservoirs are valved conduits, namely air intake conduit 18 allowing only for the flow of air into chamber 16, and exhaust conduit 20 allowing only for the flow of exhaust gas from chamber 16. Air intake conduit 18 is equipped with valve 71 and exhaust conduit 20 is equipped with valve 72. These valves are operated by linkage to regenerative means mover shaft 24 or piston rod 54, or in some other way such that their operation is keyed to the movement of movable heat-regenerative means 33. Valve 71 may also be of a check-valve type permitting flow only into the chamber. Fuel injection means 13 provides communication from an external fuel supply reservoir to gas chamber 16. Fuel injection means 13 is equipped with carburetion means 73 which may be used to atomize the fuel if a liquid fuel is being used. Fuel injection means 13 may also be positioned on the right side of the regenerative means 33, as shown in FIG. 1, with fuel supply through rod 24 to hot volume 31.

Regenerative means mover shaft 24 extends through first end 95 and outer shell casing 19, penetrating first end 95 in fluid-tight relationship, and sliding on contact sleeve 61. Regenerative means mover shaft is connected through suitable linkage means not shown to a power source which causes regenerative means mover shaft 24 to undergo a reciprocating movement. Secured to regenerative means mover shaft near the end thereof and within gas chamber 16 is movable heat-regenerative means 33. Movable heat-regenerative means 33 within gas chamber 16 is generally cylindrical in shape and extends substantially across the gas chamber. Heat-regenerative means 33 may be equipped with a cylindrical heat shield 133, as shown in FIG. 11, protecting walls 38 from direct contact with hot gases. Movable heat-regenerative means 33 is moved by the reciprocating movement of regenerative means mover shaft 24, and its movement is substantially parallel to the axis of gas chamber 16. Movable heat-regenerative means 33 divides gas chamber 16 into substantially two volumes, a first or "cold" volume 29 and a second or "hot" volume 31.

Movable heat-regenerative means 33 separates cold volume 29 from hot volume 31. The heat-regenerative means is constructed of materials having suitable thermal properties such as stainless steel, Hastalloy, or ceramics. The heat-regenerative means is designed to have maximal frontal area consistent with suitable thermal exchange properties to minimize the pressure drop of gas by movement through said heat-regenerative means. It is also desired to have minimal dead gas volume contained within said heat-regenerative means. Heat-regenerative means 33 is constructed for thermal storage and is preferably flat or corrugated stainless steel wire cloth or fine wire mesh arranged in successive layers with no thermal contact between layers. Different porous ceramic materials or fused fibrous materials are also well suited. Such configurations provide for a substantial thermal gradient in the heat-regenerative means while creating only small dead gas volume therein.

To furnish thermal isolation of cold volume 29 from hot volume 31, insulation 14 should be constructed from thermal insulating materials. Heat shield 133 and insulation 114 on piston 97, as shown in the embodiment of FIG. 11, should also be constructed of thermal insulating materials. Many suitable materials, such as ceramics or fused silica glass are well-known in the art. Furthermore, the shell 38 may be cooled from outside.

Briefly, operation of internal combustion heat engine 17 is achieved by reciprocating movement of movable heat-regenerative means 33 which is coordinated with operation of fuel injection means 13 and valves 71 and 72. By reciprocating movement, movable heat-regenerative means 33 causes passage of air from cold volume 29 through heat-regenerative means 33 into hot volume 31 achieving an average higher temperature-pressure relation. Movable heat-regenerative means causes passage of gas therethrough by movement of itself through the gas. As air which was in cold volume 29 passes through movable heat-regenerative means 33 into hot volume 31, having been heated by movable heat-regenerative means 33, a fluid fuel is injected into hot volume 31 by fuel injection means 13 and substantially continuous burning occurs during the period of fuel injection. The burning begins by virtue of either an ignition means or the temperature conditions in hot volume 31. Such combustion substantially increases the average temperature-pressure relation to a high point and expansion of gas chamber 16 by movement of pressure-responsive member 51 provides useful mechanical energy to the outside. The high pressure thereafter also causes a portion of the enclosed gas to exit gas chamber 16 through exhaust conduit 20, valve 72 having been operated by linkage with the movable heat-regenerative means movement, thereby lowering the average pressure-temperature relation of the enclosed gas. The pressure-temperature relation is further lowered as movable heat-regenerative means 33 causes the passage of the hot combustion product gas from hot volume 31 through movable heat-regenerative means 33, now relatively cool with respect to the hot combustion product gas, into cold volume 29. As the average pressure is lowered to a point below that of the external fresh air reservoir and air intake conduit 18 opens as valve 71 operates by the pressure difference or by means of linkage with the movement of movable heat-regenerative means 33, air intake conduit 18 will admit fresh air so that the cycle may be repeated.

Pressure-responsive means 51, as shown in FIG. 1, is a piston 97. Piston 97 comprises second end 96 and extends in substantially airtight fashion across gas chamber 16. Piston 97 is responsive to pressure changes within gas chamber 16 and permits expansion of said gas chamber. Connected to piston 97 is piston rod 54. Piston 97 may be linked by means of piston rod 54 to various types of apparatus for using mechanical energy. Piston 97, responding to the pressure of expanding gases within gas chamber 16 and to a return pressure exerted through piston rod 54, moves in a reciprocating fashion on a line substantially parallel to the axis of gas chamber 16. The return pressure exerted through piston rod 54 may be the result of energy stored in a fly wheel, fluid pressure in an exterior cylinder, or a wide variety of other means. The return movement of piston 97, which contracts gas chamber 16, is not for the purpose of increasing the pressure within gas chamber 16 to provide combustion supporting conditions. During a portion of this return movement, valve 72 is permitting the exhaust of combustion product gases through exhaust conduit 20. Furthermore, the movement of movable heat-regenerative means 33 is causing passage of gas from hot volume 31 to cold volume 29, and as movable heat-regenerative means 33 absorbs heat from this gas, the gas contracts and the pressure is reduced. Therefore, the return movement of piston 97 does not and is not intended to create pressure and temperature conditions for combustion. The subsequent movement of movable heat-regenerative means 33 causes passage of air from cold volume 29 to hot volume 31, raising the temperature of the air and hence creating temperature conditions within gas chamber 16 favorable for combustion.

The pressures in the external reservoirs connected to gas chamber 16 by air intake conduit 18 and exhaust conduit 20 may vary over wide ranges. The external pressures must be such that the lowest pressure in gas chamber 16 is lower than the pressure in the external reservoir connected by air intake conduit 18, and the highest pressure in gas chamber 16 is higher than the pressure in the external reservoir connected by exhaust conduit 20. Normally, the external reservoirs connected by air intake conduit 18 and exhaust conduit 20 will be the atmosphere, but other reservoirs may be used.

The pressures in volumes 29 and 31 remain about equal except for the preferably minor pressure drop through heat-regenerative means 33. Due to the small pressure drop in heat-regenerative means 33, a very small power input is required to cause reciprocation of movable heat-regenerative means 33 and operate the valves and fluid fuel injection means 13. In fact, in use, the energy input required for the reciprocation and operation of valves and injection means is insignificant when compared to the total energy input to the internal combustion heat engine, the major energy input being the potential energy of combustion attributable to the fuel and oxygen. Typically, after initiation of reciprocating movement of movable heat-regenerative means 33 by an external power means, the movement of movable heat-regenerative means 33 and operation of the valves and fluid fuel injection means will be by suitable linkage with pressure-responsive member 51. Valves 71 and 72 and fluid injection means 13 may be operated by direct linkage to pressure-responsive member 51 or indirectly through regenerative means mover shaft 24. The total energy input requirement of the internal combustion heat engine of this invention is further minimized by use of heat-regenerative means 33 which is known to be extremely efficient in takeup, storage, and release of thermal energy. A high temperature ratio between hot volume 31 and cold volume 29 is desirable.

For more detailed description of the operation of the internal combustion heat engine of this invention, reference is made to FIGS. 3 to 9 showing schematically a device according to this invention being made like the embodiments shown in FIGS. 1 and 2 and 11. Pressure-responsive member 51 is a piston. In FIGS. 3 to 9, the arrows indicate the direction of movement of movable heat-regenerative means 33 and pressure-responsive member 51. Cross hatched lines indicate the volume of gas in cold volume 29 and slant lines indicate the volume of gas in hot volume 31. When average temperatures are referred to they are the mass average absolute temperatures of all enclosed gas in the internal combustion heat engine, including gas within the movable heat-regenerative means. The passage or non-passage of intake air, exhaust gas and fuel are pictorially indicated.

Referring to FIGS. 3 to 9, the sequential steps of the process of my invention are illustrated. Referring specifically to FIG. 3, the maximum amount of gas is contained in cold volume 29 at a slightly lower pressure than the pressure of the external reservoir connected to chamber 16 by air intake conduit 18. Due to this pressure difference, air or other combustion-supportable gas passes into gas chamber 16 through air intake conduit 18, valve 71 having been opened. Note that exhaust conduit 20 and fuel injection means 13 are closed. Pressure-responsive member 51 is in an inward position, near fuel injection means 13. Movable heat-regenerative means 33, actuated by an independent power source or by linkage with pressure-responsive member 51, starts to move in a leftward direction causing passage of the gas enclosed within gas chamber 16 through movable heat-regenerative means 33, which is relatively hot from operation of the prior cycle. The temperature of the gas passing through movable heat-regenerative means 33 is raised. The mass average temperature of the enclosed gas is also raised.

In FIG. 4, partial leftward movement of movable heat-regenerative means 33 is shown and the concomitant heating of the enclosed gas causes an increase in pressure of the enclosed gas such that it surpasses the pressure in the external reservoir which is connected to gas chamber 16 by air intake conduit 18, and the gas flow into chamber 16 from conduit 18 stops, valve 71 closing. Movable heat-regenerative means 33 continues its leftward movement, as shown in FIG. 5, thereby causing passage of more gas through movable heat-regenerative means 33 raising the mass average temperature and pressure. Fuel injection means 13 is opened by timed mechanical means not show typically, linkage as described earlier, at a point in the cycle at a time about as shown in FIG. 4 or FIG. 5, injecting a combustible fluid fuel into the hot volume. Upon the start of the fuel injection period, the fuel will be ignited either by virtue of the existing temperature conditions in hot volume 31 or with the aid if ignitions means 52.

Ignition means 52 may be a spark device, glow plug or any other device suitable to ignite the injected fuel for a continuous burn during injection. A small hot electrical coil or a glow plug is preferred to avoid timing problems associated with spark plugs. The ignition means is operated by an outside means not shown. Typically, the ignition means would be connected to a battery. The ignitions means will be placed in a position enabling ignition of the fuel being injected. The ignition means is intended only as an ignition device and is not intended to heat hot volume 31. The necessity for an ignition means diminishes as heat-regenerative means 31 serves to create conditions suitable for combustion, and in many instances the ignition means may be turned off entirely after the engine has warmed up.

When the period of continuous combustion has begun the temperature of the enclosed gas will rapidly increase as well as the mass average temperature and pressure. As a certain pressure is reached and surpassed, gas chamber 16 will expand as pressure-responsive means 51 moves to the right as shown in FIG. 6, thereby permitting mechanical energy to be transmitted from the internal combustion engine. The combustion continues as the injection of fuel continues. Note that both air intake conduit 18 and exhaust conduit 20 are closed. Movable heat-regenerative means 33, as mentioned earlier, may be actuated by an independent power source and in any case is not moved directly by virtue of the combustion and consequent increase in pressure. The pressures in cold volume 29 and hot volume 31 are substantially consistent because there is very little hindrance to gas passage through movable heat-regenerative means 33.

Referring specifically to FIG. 7, the maximum amount of gas is contained in hot volume 29 at a high pressure. The pressure in gas chamber 16 is higher than the pressure in the exhaust reservoir which communicates with gas chamber 16 by means of exhaust conduit 20. Combustion product gas will pass from gas chamber 16 through exhaust conduit 20, valve 72 having been opened. The injection of fuel is stopped by the injection means. Pressure responsive member 51 returns to its inward position. Movable heat-regenerative means 33, as illustrated in FIG. 8, begins its rightward movement, causing passage of the enclosed gas from hot volume 31 to cold volume 29 through movable heat-regenerative means 33, which now is relatively cool with respect to the temperature of the enclosed gas which has been heated by combustion of the fuel. As the combustion product gas passes from hot volume 31 to cold volume 29 in heat-exchange relation with movable heat-regenerative means 33, the heating of heat-regenerative means 33 is accomplished.

In FIG. 9, the continuing rightward movement of movable heat-regenerative means 33 is shown causing a decrease in the temperature of the enclosed gas and a concomitant decrease in pressure of the enclosed gas such that the opening of valve 71 permits air intake conduit 18 to admit combustion-supportable gas by virtue of the higher pressures in the reservoir external to air intake conduit 18. Movement of movable heat-regenerative means 33 continues until the position shown in FIG. 3 is obtained and the cycle is continued in like fashion.

The cycle of my internal combustion heat engine as described in references to FIGS. 3 to 9 is not the only cycle which may be used. Another cycle arrangement is a 2-stroke cycle with "scavenging." A scavenger blower or its equivalent replaces the air intake conduit and during the latter part of the cooling stroke forces air through cold volume 29 while exhaust conduit 20 is open. Exhaust valve 72 opens, in this cycle, during the latter part of the cooling stroke when the pressure in gas chamber 16 is only slightly greater than the pressure in exhaust conduit 20. This cycle eliminates the exhaust "puff" when the exhaust valve opens and the consequent thermodynamic loss which occurs in the first cycle described, and also provides a purer combustion-supportable gas to aid in the succeeding combustion.

The cycles described were 2-stroke cycles, having a cooling or rightward stroke of the movable heat-regenerative means and a heating or leftward stroke. The heating stroke heated and therefore compressed the enclosed gas. The cooling stroke cooled and therefore caused the contraction of the enclosed gas. A 4-stroke cycle may replace the 2-stroke cycle described. This can be accomplished by letting the exhaust conduit be open during every other heating stroke while no fuel is being injected and no combustion taking place. The air intake conduit would be open during the succeeding cooling stroke when the remaining gas in the gas chamber is cooled by flowing through the heat-regenerative means. The succeeding heating stroke becomes a combustion stroke during which the air intake and exhaust conduits are closed. During the following cooling stroke both conduits remain closed. The advantage of the 4-stroke cycle just described is that it, as well as the 2-stroke cycle with scavenging, eliminates the exhaust puff and the consequent thermodynamic loss which occurs during the cooling stroke in the two-stroke cycle first described.

Wide ranges of movable heat-regenerative means frequencies are suitable for operation of the internal combustion heat engine of my invention. From about 30 to about 600 cycles per minute are well suited for operation of the embodiment of my invention shown in FIGS. 1 and 2. Preferred frequencies are from about 100 to 300 cycles per minute.

A wide variety of pressure-responsive members may be positioned as a part of shell casing 15 in contact with the gas contained in gas chamber 16, permitting expansion of gas chamber 16. Any device which can respond to the pressure increase in a manner allowing utilization of the resultant mechanical energy is suitable. The preferred piston is shown in FIGS. 1 and 11. A thermally protected membrane positioned as a part of shell casing 15 is another suitable pressure-responsive member. Some suitable pressure-responsive members are shown in my U.S. Pat. No. 3,474,641. Any person skilled in the art and familiar with this invention will readily recognize many methods for harnessing the energy produced by the internal combustion heat engine and process of this invention. A wide variety of seals may be used with pressure-responsive members. Positive seals such as bellows are suitable. Common piston rings are preferred seals when the pressure-responsive member is a piston.

Hard pressure-responsive members such as the piston of FIGS. 1 and 11 may be made of stainless steel or stainless steel alloys or other similar materials. The face of a piston will often be exposed to the hot volume of the internal combustion heat engine of this invention, because if the piston is exposed to the cold volume, excessive dead volume in the gas chamber may become necessary to prevent interference of the movable heat-regenerative means with the piston. Furthermore, since it is preferable to have the valves allowing inlet and exhaust from the cold volume, the functional parts of the internal combustion heat engine will be better spaced if the piston is exposed to the hot volume. By using an insulating material such as ceramics as a thermal protection the metal parts of the piston and its seals can be kept at relatively low temperatures by means of some external cooling. Such an insulator is shown in FIG. 11 as 114.

Piston rod 54 may serve to transmit mechanical energy for a variety of purposes. For example, piston rod 54 may turn a wheel or operate another piston in a compressor. For such an arrangement the movement of piston rod 54 should be synchronized to the movement of regenerator 33 in such a fashion that the piston 51 travels mainly when the regenerator is in its end positions. Specifically, the expansion of chamber 16 will not start until the regenerator has reached its left end position with substantially all air in the hot volume. This will permit a higher pressure build-up than if piston 51 starts its expansion-stroke at an earlier point in the cycle. Similar considerations can be made also for the contraction-stroke of piston 51. With such synchronized movements of piston 51 and regenerator 33, a somewhat higher mean effective pressure of the engine can be achieved.

FIG. 11, as well as illustrating another embodiment of the internal combustion heat engine of my invention, illustrates its use in directly operating a compressor. In FIG. 11, piston rod 54 is connected to compressor piston 91 which, by the movement of piston rod 54, undergoes a reciprocating movement within chamber 42. Chamber 42 is defined by compressor cylinder casing 81. Compressor piston 91 extends in substantially fluid-tight fashion across chamber 42. Opening 82 is provided in order to balance the forces during the movement of compressor piston 91 in a suitable way. Piston rod 54 slides within contact sleeve 92. The reciprocating movement causes change in the pressure in chamber 42. As the movement of compressor piston 91 increases the volume of chamber 42, the pressure in chamber 42 decreases causing check valve 44 to open permitting flow of fluid into chamber 42. As the movement of compressor piston 91 decreases the volume of chamber 42, the pressure in chamber 42 increases, causing check valve 40 to open permitting the exit of fluid from chamber 42. Cycling of such steps produces a pumping action through chamber 42.

Such pumping action effectively drives a refrigerant through a cooling cycle or may be used for a wide variety of other pumping applications. The fluid in chamber 42 may be a liquid or a gas. FIG. 11 shows a cooling mechanism comprising condenser means, expansion means, evaporation means, compression means and contained refrigerant wherein said compression means is actuated by movement of said pressure responsive member. The compressor piston 92 and compressor cylinder 81 show the compression means of the cooling mechanism shown in FIG. 11.

According to this invention, a refrigeration system is provided whereby an internal combustion heat engine may be used to actuate a compression means of the refrigeration system comprised of a condenser means, expansion means, evaporation means, compression means and a contained refrigerant. The working gas in gas chamber 16 is isolated from any other gas or fluid which utilizes work output of the invention. Therefore, it is possible to utilize a second gas, having optimal properties as a refrigerant in a cooling system driven by work output from the internal combustion heat engine. The refrigerant may be a fluid which possesses the most desirable physical properties for such use.

FIG. 10 shows the thermodynamic curves for a refrigeration system according to this invention. Different absolute pressures may be used in the power cycle and the cooling cycle. The power cycle is shown wherein position A corresponds with the physical configuration shown in FIG. 3. The increase in temperature at constant volume between points A and B is illustrated by the configuration shown in FIG. 4. Further heating at constant pressure from point B to C is shown by the configuration in FIG. 5, and the mid-point of the power cycle shown at point C corresponds to the physical configuration shown in FIG. 7. Cooling at constant volume between points C and D corresponds to the configuration shown in FIG. 8. Further cooling at constant pressure between points D and A is illustrated by the configuration in FIG. 9. The cooling cycle illustrates a standard Freon cooling cycle.

The overall coefficient of the performance of from about 1.0 to 1.3 can be achieved by using the cooling system of this invention. These coefficients of performance have been calculated using natural gas as the combustible fluid fuel heat source for the power cycle and Freon as the refrigerant, and represent the overall efficiency from the natural fuel to the cooling output.

Internal combustion heat engine 17 may be made of a wide variety of materials. Of prime importance are the strength, conduction and thermal properties of materials used. The different insulations, as already mentioned, should be made of low conductivity materials with low porosity or permeability. If the material is permeable and porous the volume of gas in the material will act as a "dead volume." Examples of materials suitable for other parts of the shell casing, regenerative means mover shaft, piston rod, contact sleeves, and support means, are stainless steel and various stainless steel alloys. Wide varieties of insulation common in the art may be used. Many types of valves that are common in the art may be used in the device of my invention. Valves of the type commonly used on automobile engines are suitable.

The fluid fuel used in the internal combustion heat engine of my invention may be either a gas or a liquid. Any fluid which will burn at temperatures suitable for practical use and providing sufficient pressure gradients is suitable. The liquid or gaseous hydrocarbons, whether synthetic or fossil fuels, are preferred. Natural gas, methane, ethane, propane and butane are preferred since they burn cleanly. Natural gas is most preferred. Hydrogen is a suitable fluid fuel. Oil and gasoline, as well as other liquid fuels, may also be used. When a liquid fluid fuel is used, carburetion means 73 may be used to atomize the fuel for the most desirable combustion. Carburetion means 73 is not required, particularly when a gas fluid fuel is used.

The movable heat-regenerative means of this invention has been found to be very efficient in takeup, storage and release of heat energy. Efficiencies over 90 percent are common. Therefore, the temperature difference between hot volume 31 and cold volume 29 may be substantial. I have found that typical temperatures for the hot and cold volumes are approximately 2,000° F. and 250° F. Operable ranges for the hot and cold volumes are difficult to state since the engine will work with any substantial temperature difference and over wide ranges. Typically, the cold volume temperature will be in the range of from about 100° to 250° F. while the hot volume temperature will be in the range from about 1,000° to 2,500° F.

The internal combustion heat engine of my invention may be air cooled or water cooled in a wide variety of methods. Cooling methods common in the prior art are suitable for this invention.

Any combustion-supportable gas could be used in gas chamber 16 of the internal combustion heat engine of my invention. Although air is preferred, enriched oxygen gases also may be used. The combustion-supportable gas will enter the gas chamber through air intake conduit 18. Air intake conduit 18 will normally allow access to cold volume 29 of gas chamber 16. However, its location is not necessarily determined with reference to the location of exhaust conduit 20. If a scavenger blower or its equivalent is used, it is preferred the air intake conduit 18 and exhaust conduit 20 be located such that a draft across cold volume 29 is provided.

Fuel injection means provide injection of a combustible fluid fuel into hot volume 31. The fuel injection means may be mounted on the movable heat-regenerative means on the piston or in the shell casing as indicated. The latter is preferred because it is mechanically simpler although the former may more easily permit a clean and even combustion on the hot face of the regenerator.

Many uses may be made of the internal combustion heat engine of my invention. A cooling system is but one. The internal combustion heat engine of my invention may be used as a prime mover in a wide variety of applications. In addition to use as a pump or compressor, the internal combustion heat engine of my invention may be adapted for use in transportation machinery and other types of machinery.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for conversion of chemical energy to mechanical energy comprising:

passing combustion-supportable gas into a substantially gastight gas chamber, heating said gas by passage in heat-exchange relation with a moving heat-regenerative means, injecting a combustible fluid fuel into said gas chamber for contact with said heated combustion-supportable gas during said heating, substantially continuous burning of said fuel in contact with said heated combustion-supportable gas during said injecting thereby forming combustion product gas, expanding said gas chamber by movement of a pressure-responsive member, heating said heat-regenerative means by passage of said combustion product gas in heat-exchange relation with said moving heat-regenerative means, and passing said combustion product gas from said gas chamber.

2. The process of claim 1 wherein said combustible fluid fuel is selected from a class consisting of the liquid or gaseous hydrocarbons.

3. The process of claim 1 wherein said combustible fluid fuel is selected from the class consisting of methane, ethane, propane and butane.

4. The process of claim 1 wherein said combustible fluid fuel is natural gas.

5. The process of claim 1 wherein said combustible fluid fuel is in a gaseous form.

6. The process of claim 1 wherein said combustible fluid fuel is in a liquid form.

7. An internal combustion heat engine comprising a casing defining a gas chamber for confining gas, a movable heat-regenerative means within said gas chamber extending substantially across said gas chamber and movable within said gas chamber, said heat-regenerative means dividing said gas chamber into a first and second volume and by movement causing passage of said gas from said first volume through said heat-regenerative means into said second volume at a higher average temperature-pressure relationship and from said second volume through said heat-regenerative means into said first volume at a lower average temperature-pressure relationship, a power means to move said heat-regenerative means, an air intake conduit for passage of a combustion-supportable gas into said first volume, an exhaust conduit for passage of combustion product gas from said first volume, fuel injection means for injection of a combustible fluid fuel into said second volume, an ignition means, and a pressure-responsive member in said casing permitting expansion and contraction of said gas chamber.

8. An internal combustion heat engine comprising a casing comprising a side wall and first and second ends and defining a generally cylindrical gas chamber for confining gas, a generally cylindrical movable heat-regenerative means within said gas chamber extending substantially across said gas chamber and movable within said gas chamber substantially parallel to the axis of said gas chamber, said heat-regenerative means dividing said gas chamber into a first and second volume and by reciprocating movement causing passage of said gas from said first volume through said heat-regenerative means into said second volume at a higher average temperature-pressure relationship and from said second volume through said heat-regenerative means into said first volume at a lower average temperature-pressure relationship, a power means to move said heat-regenerative means, an air intake conduit for passage of a combustion-supportable gas into said first volume, an exhaust conduit for passage of combustion product gas from said first volume, fuel injection means for injection of a combustible fluid fuel into said second volume, an ignition means, and a pressure-responsive member in said casing permitting expansion and contraction of said gas chamber.

9. The internal combustion heat engine of claim 8 wherein said pressure-responsive member is a piston comprising said second end.

10. The internal combustion engine of claim 8 wherein said combustible fluid fuel is selected from a class consisting of the liquid or gaseous hydrocarbons.

11. The internal combustion engine of claim 8 wherein said heat-regenerative means reciprocates at from about 30 to 600 cycles per minute.

12. The internal combustion heat engine of claim 8 wherein said heat-regenerative means reciprocates at from about 100 to 300 cycles per minute.

13. A cooling apparatus comprising an internal combustion heat engine comprising a casing comprising a side wall and first and second ends and defining a generally cylindrical gas chamber for confining gas, a generally cylindrical movable heat-regenerative means within said gas chamber extending substantially across said gas chamber and movable within said gas chamber substantially parallel to the axis of said gas chamber, said heat-regenerative means dividing said gas chamber into a first and second volume and by reciprocating movement causing passage of said gas from said first volume through said heat-regenerative means into said second volume at a higher average temperature-pressure relationship and from said second volume through said heat-regenerative means into said first volume at a lower average temperature-pressure relationship, a power means to move said heat-regenerative means, an air intake conduit for passage of a combustion-supportable gas into said first volume, an exhaust conduit for passage of combustion product gas from said first volume, fuel injection means for injection of a combustible fluid fuel into said second volume, an ignition means, and a pressure-responsive member in said casing permitting expansion and contraction of said gas chamber, in combination with a cooling mechanism comprising condenser means, expansion means, evaporation means, compression means and contained refrigerant wherein said compression means is actuated by movement of said pressure-responsive member.

14. The cooling apparatus of claim 13 wherein said combustible fluid fuel is selected from the class consisting of the liquid or gaseous hydrocarbons.

15. The cooling apparatus of claim 13 wherein said pressure-responsive member is a piston comprising said second end.

16. The cooling apparatus of claim 13 wherein said heat-regenerative means reciprocates at from about 30 to 600 cycles per minute.

17. The cooling apparatus of claim 13 wherein said heat-regenerative means receiprocates at from about 100 to 300 cycles per minute.

* * * * *